United States Patent
Lee et al.

(10) Patent No.: US 10,602,454 B2
(45) Date of Patent: Mar. 24, 2020

(54) METHOD FOR CONTROLLING UPLINK TRANSMISSION POWER IN WIRELESS COMMUNICATION SYSTEM AND DEVICE THEREFOR

(71) Applicant: LG ELECTRONICS INC., Seoul (KR)

(72) Inventors: Hyunho Lee, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/300,523

(22) PCT Filed: May 10, 2017

(86) PCT No.: PCT/KR2017/004808
§ 371 (c)(1),
(2) Date: Nov. 9, 2018

(87) PCT Pub. No.: WO2017/196065
PCT Pub. Date: Nov. 16, 2017

(65) Prior Publication Data
US 2019/0159138 A1 May 23, 2019

Related U.S. Application Data

(60) Provisional application No. 62/334,374, filed on May 10, 2016, provisional application No. 62/373,983, filed on Aug. 11, 2016.

(51) Int. Cl.
*H04W 52/14* (2009.01)
*H04W 52/34* (2009.01)
*H04W 52/36* (2009.01)

(52) U.S. Cl.
CPC ....... *H04W 52/146* (2013.01); *H04W 52/346* (2013.01); *H04W 52/367* (2013.01)

(58) Field of Classification Search
CPC H04W 52/146; H04W 52/346; H04W 52/367
(Continued)

(56) References Cited

U.S. PATENT DOCUMENTS 8,958,342 B2 * 2/2015 Dinan ................ H04W 52/18
370/254
8,964,593 B2 * 2/2015 Dinan ................ H04W 52/34
370/252

(Continued)

FOREIGN PATENT DOCUMENTS

KR 1020150128247 11/2015
WO 2016040290 3/2016

OTHER PUBLICATIONS

PCT International Application No. PCT/KR2017/004808, Written Opinion of the International Searching Authority dated Aug. 21, 2017, 27 pages.

*Primary Examiner* — Hai V Nguyen
(74) *Attorney, Agent, or Firm* — Lee Hong Degerman Kang Waimey

(57) ABSTRACT

According to one embodiment of the present invention, a method by which a terminal, which is configured so as to support a plurality of cells having one or more transmission time interval (TTI) lengths or subcarrier spacings, controls uplink transmission power in a wireless communication system comprises the steps of: calculating transmission power for uplink transmission; and performing uplink transmission for a specific cell by the calculated transmission power, wherein the calculated transmission power can be allocated up to a maximum transmission power configured for the terminal in a symbol or a TTI of the uplink transmission for a cell different from the specific cell, or in a (Continued)

symbol or a TTI, which does not overlap with a symbol or a TTI of uplink transmission having a different TTI length or a different subcarrier spacing from those of the uplink transmission for the specific cell.

11 Claims, 8 Drawing Sheets

(58) Field of Classification Search
USPC .................................................. 455/522, 69
See application file for complete search history.

(56) References Cited

U.S. PATENT DOCUMENTS

| | | | |
|---|---|---|---|
| 8,964,683 B2* | 2/2015 | Dinan | H04W 52/146 370/329 |
| 8,971,280 B2* | 3/2015 | Dinan | H04W 52/146 370/329 |
| 8,989,128 B2* | 3/2015 | Dinan | H04W 52/146 370/329 |
| 8,995,381 B2* | 3/2015 | Dinan | H04W 72/0406 370/329 |
| 9,179,425 B2* | 11/2015 | Dinan | H04W 52/386 |
| 9,204,406 B2* | 12/2015 | Dinan | H04W 52/146 |
| 9,210,664 B2* | 12/2015 | Dinan | H04W 52/18 |
| 9,210,665 B2* | 12/2015 | Dinan | H04W 52/18 |
| 9,241,326 B2* | 1/2016 | Dinan | H04W 52/34 |
| 9,319,194 B2* | 4/2016 | Dinan | H04W 52/146 |
| 9,357,510 B2* | 5/2016 | Damnjanovic | H04W 52/365 |
| 9,414,332 B2* | 8/2016 | Dinan | H04W 52/18 |
| 9,615,339 B2* | 4/2017 | Dinan | H04W 52/386 |
| 9,629,097 B2* | 4/2017 | Ahn | H04W 52/146 |
| 9,642,098 B2* | 5/2017 | Dinan | H04W 52/146 |
| 9,681,399 B2* | 6/2017 | Dinan | H04W 52/146 |
| 9,736,795 B2* | 8/2017 | Dinan | H04W 52/34 |
| 9,763,203 B2* | 9/2017 | Dinan | H04W 52/146 |
| 9,769,772 B2* | 9/2017 | Dinan | H04W 52/146 |
| 9,820,283 B2* | 11/2017 | Dinan | H04W 72/0406 |
| 9,844,006 B2* | 12/2017 | Dinan | H04W 52/18 |
| 9,867,137 B2* | 1/2018 | Dinan | H04W 52/18 |
| 10,064,191 B2* | 8/2018 | Dinan | H04W 72/0473 |
| 10,128,998 B2* | 11/2018 | Byun | H04L 5/0051 |
| 10,264,598 B2* | 4/2019 | Dinan | H04L 5/00 |
| 10,278,134 B2* | 4/2019 | Dinan | H04W 52/18 |
| 10,327,236 B2* | 6/2019 | Dinan | H04L 5/00 |
| 10,356,767 B2* | 7/2019 | Dinan | H04W 72/0413 |
| 10,367,630 B2* | 7/2019 | Byun | H04W 72/0446 |
| 10,383,105 B2* | 8/2019 | Byun | H04W 72/042 |
| 10,397,912 B2* | 8/2019 | Byun | H04B 7/26 |
| 10,420,138 B2* | 9/2019 | Byun | H04L 5/0053 |
| 10,425,205 B2* | 9/2019 | Hosseini | H04L 5/0048 |
| 10,432,362 B2* | 10/2019 | Iyer | H04L 1/1614 |
| 2013/0272229 A1* | 10/2013 | Dinan | H04W 52/18 370/329 |
| 2013/0272230 A1* | 10/2013 | Dinan | H04W 52/18 370/329 |
| 2013/0272231 A1* | 10/2013 | Dinan | H04W 52/34 370/329 |
| 2013/0272232 A1* | 10/2013 | Dinan | H04W 52/386 370/329 |
| 2013/0272233 A1* | 10/2013 | Dinan | H04W 72/0406 370/329 |
| 2013/0279433 A1* | 10/2013 | Dinan | H04W 52/146 370/329 |
| 2013/0279434 A1* | 10/2013 | Dinan | H04W 52/146 370/329 |
| 2013/0279435 A1* | 10/2013 | Dinan | H04W 52/146 370/329 |
| 2015/0131589 A1* | 5/2015 | Dinan | H04W 52/34 370/329 |
| 2015/0131590 A1* | 5/2015 | Dinan | H04W 52/146 370/329 |
| 2015/0139162 A1* | 5/2015 | Dinan | H04W 52/18 370/329 |
| 2015/0146660 A1* | 5/2015 | Dinan | H04W 52/146 370/329 |
| 2015/0181547 A1* | 6/2015 | Dinan | H04W 52/146 370/336 |
| 2015/0208358 A1* | 7/2015 | Ahn | H04W 52/146 455/522 |
| 2015/0282104 A1* | 10/2015 | Damnjanovic | H04W 52/365 455/522 |
| 2016/0057714 A1* | 2/2016 | Dinan | H04W 52/386 370/280 |
| 2016/0080126 A1* | 3/2016 | Dinan | H04W 52/146 370/329 |
| 2016/0100372 A1* | 4/2016 | Dinan | H04W 52/18 370/329 |
| 2016/0100425 A1* | 4/2016 | Dinan | H04W 52/18 370/329 |
| 2016/0112971 A1* | 4/2016 | Dinan | H04W 52/34 370/329 |
| 2016/0192361 A1* | 6/2016 | Dinan | H04W 52/146 370/329 |
| 2016/0242184 A1* | 8/2016 | Dinan | H04W 72/0406 |
| 2016/0316436 A1* | 10/2016 | Dinan | H04W 52/18 |
| 2016/0316439 A1* | 10/2016 | Dinan | H04W 52/34 |
| 2016/0316440 A1* | 10/2016 | Dinan | H04W 52/146 |
| 2017/0099127 A1* | 4/2017 | Byun | H04L 5/0051 |
| 2017/0118753 A9* | 4/2017 | Dinan | H04W 52/146 |
| 2017/0171842 A1* | 6/2017 | You | H04L 5/0048 |
| 2017/0223695 A1* | 8/2017 | Kwak | H04W 56/0075 |
| 2017/0303182 A1* | 10/2017 | Uchino | H04W 16/32 |
| 2017/0310431 A1* | 10/2017 | Iyer | H04L 1/1816 |
| 2018/0014263 A1* | 1/2018 | Dinan | H04W 52/146 |
| 2018/0014306 A1* | 1/2018 | Dinan | H04W 72/0406 |
| 2018/0049165 A1* | 2/2018 | Byun | H04W 72/0446 |
| 2018/0167890 A1* | 6/2018 | Dinan | H04W 52/18 |
| 2018/0183552 A1* | 6/2018 | Hosseini | H04L 5/0082 |
| 2018/0184384 A1* | 6/2018 | Dinan | H04W 52/34 |
| 2018/0206266 A1* | 7/2018 | Byun | H04L 5/0053 |
| 2018/0212732 A1* | 7/2018 | You | H04L 5/0051 |
| 2018/0234998 A1* | 8/2018 | You | H04W 72/042 |
| 2018/0242259 A1* | 8/2018 | Dinan | H04W 52/18 |
| 2018/0249427 A1* | 8/2018 | Dinan | H04W 52/146 |
| 2018/0278393 A1* | 9/2018 | Akula | H04L 5/0051 |
| 2018/0294942 A1* | 10/2018 | Byun | H04L 5/14 |
| 2018/0310280 A1* | 10/2018 | Byun | H04L 5/0053 |
| 2018/0359068 A1* | 12/2018 | Kim | H04W 72/0406 |
| 2019/0037562 A1* | 1/2019 | Park | H04L 1/00 |
| 2019/0044692 A1* | 2/2019 | Li | H04L 1/1887 |
| 2019/0052483 A1* | 2/2019 | Akula | H04L 5/0048 |
| 2019/0098622 A1* | 3/2019 | Lee | H04W 72/042 |
| 2019/0116611 A1* | 4/2019 | Lee | H04W 72/1278 |
| 2019/0141733 A1* | 5/2019 | Kim | H04W 72/1289 |
| 2019/0141737 A1* | 5/2019 | Kim | H04W 72/0446 |
| 2019/0150097 A1* | 5/2019 | Seo | H04W 72/0473 370/329 |
| 2019/0159138 A1* | 5/2019 | Lee | H04W 52/146 |
| 2019/0199502 A1* | 6/2019 | Wang | H04L 27/2602 |
| 2019/0215836 A1* | 7/2019 | Dinan | H04L 5/001 |
| 2019/0215856 A9* | 7/2019 | Nory | H04L 1/0018 |
| 2019/0223204 A1* | 7/2019 | Kim | H04W 72/1273 |
| 2019/0281623 A1* | 9/2019 | Andgart | H04L 5/0082 |

* cited by examiner

METHOD FOR CONTROLLING UPLINK TRANSMISSION POWER IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/004808, filed on May 10, 2017, which claims the benefit of U.S. Provisional Application Nos. 62/334,374, filed on May 10, 2016, and 62/373,983, filed on Aug. 11, 2016, the contents of which are all hereby incorporated by reference herein in their entirety.

TECHNICAL FIELD

The present invention relates to a wireless communication system, and more particularly, to a method and apparatus for controlling uplink transmission power in a wireless communication system.

BACKGROUND ART

In a wireless communication system, a transmission and reception scheme is under discussion, in which for a latency-sensitive service/user equipment (UE), a short transmission time interval (TTI) is used to transmit data and a response for the data, as fast as possible for a short time in order to reduce latency as much as possible. On the other hand, for a latency-tolerant service/UE, a long TTI may be used for data transmission/reception. For a service/UE sensitive to power efficiency, not latency, data may be transmitted repeatedly or in an extended TTI, with the same low power. To enable this operation, the present invention proposes a method of controlling uplink transmission power.

DISCLOSURE

Technical Problem

The present invention is intended to propose a method of controlling uplink transmission power in a wireless communication system, and operations related to the method.

It will be appreciated by persons skilled in the art that the objects that could be achieved with the present disclosure are not limited to what has been particularly described hereinabove and the above and other objects that the present disclosure could achieve will be more clearly understood from the following detailed description

Technical Solution

In an embodiment of the present invention, a method of controlling uplink transmission power for a terminal configured to support a plurality of cells having one or more transmission time interval (TTI) lengths or subcarrier spacings in a wireless communication system includes calculating transmission power for an uplink transmission, and performing the uplink transmission for a specific cell with the calculated transmission power. The calculated transmission power may be allocated up to a maximum transmission power configured for the terminal in a symbol or a TTI which does not overlap with a symbol or a TTI of an uplink transmission for a cell different from the specific cell, or a symbol or a TTI of an uplink transmission having a TTI length or a subcarrier spacing different from a TTI length or a subcarrier spacing of the uplink transmission for the specific cell.

Additionally or alternatively, the calculated transmission power may not be limited to per-carrier maximum transmission power configured for the terminal.

Additionally or alternatively, power guaranteed for the uplink transmission for the cell different from the specific cell, or the uplink transmission having a TTI length or a subcarrier spacing different from the TTI length or the subcarrier spacing of the uplink transmission for the specific cell may not be reserved.

Additionally or alternatively, the method may further include performing puncturing for an uplink transmission for a cell different from the specific cell, or an uplink transmission having a TTI length or a subcarrier spacing different from the TTI length or subcarrier spacing of the uplink transmission in the specific cell, which overlaps with the uplink transmission for the specific cell, and adding, to the uplink transmission for the specific cell, a power allocated for the uplink transmission for the cell different from the specific cell, or a power allocated for the uplink transmission having a TTI length or a subcarrier spacing from the TTI length or the subcarrier spacing of the uplink transmission for the specific cell.

Additionally or alternatively, the uplink transmission for the cell different from the specific cell, or the uplink transmission having a TTI length or a subcarrier spacing different from the TTI length or the subcarrier spacing of the uplink transmission for the specific cell may have a lower priority level than a priority level of the uplink transmission for the specific cell, a longer TTI length than the TTI length of the uplink transmission for the specific cell, or a smaller subcarrier spacing than the subcarrier spacing of the uplink transmission for the specific cell.

Additionally or alternatively, a specific channel or a specific reference signal may not be allocated to a symbol or a TTI of the uplink transmission for the cell different from the specific cell, or a symbol or a TTI of the uplink transmission having the different TTI length or the different subcarrier spacing from the TTI length or the subcarrier spacing of the uplink transmission for the specific cell.

Additionally or alternatively, the uplink transmission for the specific cell may fully overlap with the uplink transmission for the cell different from the specific cell, or the uplink transmission having the different TTI length or the different subcarrier spacing from the TTI or the subcarrier spacing of the uplink transmission for the specific cell, in a symbol or a TTI within a predetermined period.

Additionally or alternatively, a guaranteed transmission power value and a transmission power parameter may be configured independently for a specific TTI length or a specific subcarrier spacing.

Additionally or alternatively, a power transient period for power control of the uplink transmission for the specific cell may be configured to end in a symbol or a TTI used for an usage other than an uplink usage of the cell different from the specific cell.

In another embodiment of the present invention, a terminal configured to support a plurality of cells having one or more transmission time interval (TTI) lengths or subcarrier spacings in a wireless communication system includes a transmitter and a receiver, and a processor configured to control the transmitter and the receiver. The processor is configured to calculate transmission power for an uplink transmission, and to perform the uplink transmission for a specific cell with the calculated transmission power. The calculated transmission power may be allocated up to a maximum transmission power configured for the terminal in a symbol or a TTI which does not overlap with a symbol or a TTI of an uplink transmission for a cell different from the specific cell, or a symbol or a TTI of an uplink transmission having a TTI length or a subcarrier spacing different from a TTI length or a subcarrier spacing of the uplink transmission for the specific cell.

The foregoing solutions are merely a part of the embodiments of the present disclosure, and those skilled in the art could derive and understand various embodiments reflecting the technical features of the present disclosure from the following detailed description of the present disclosure.

Advantageous Effects

According to an embodiment of the present invention, uplink control information can efficiently be mapped, transmitted, or received in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
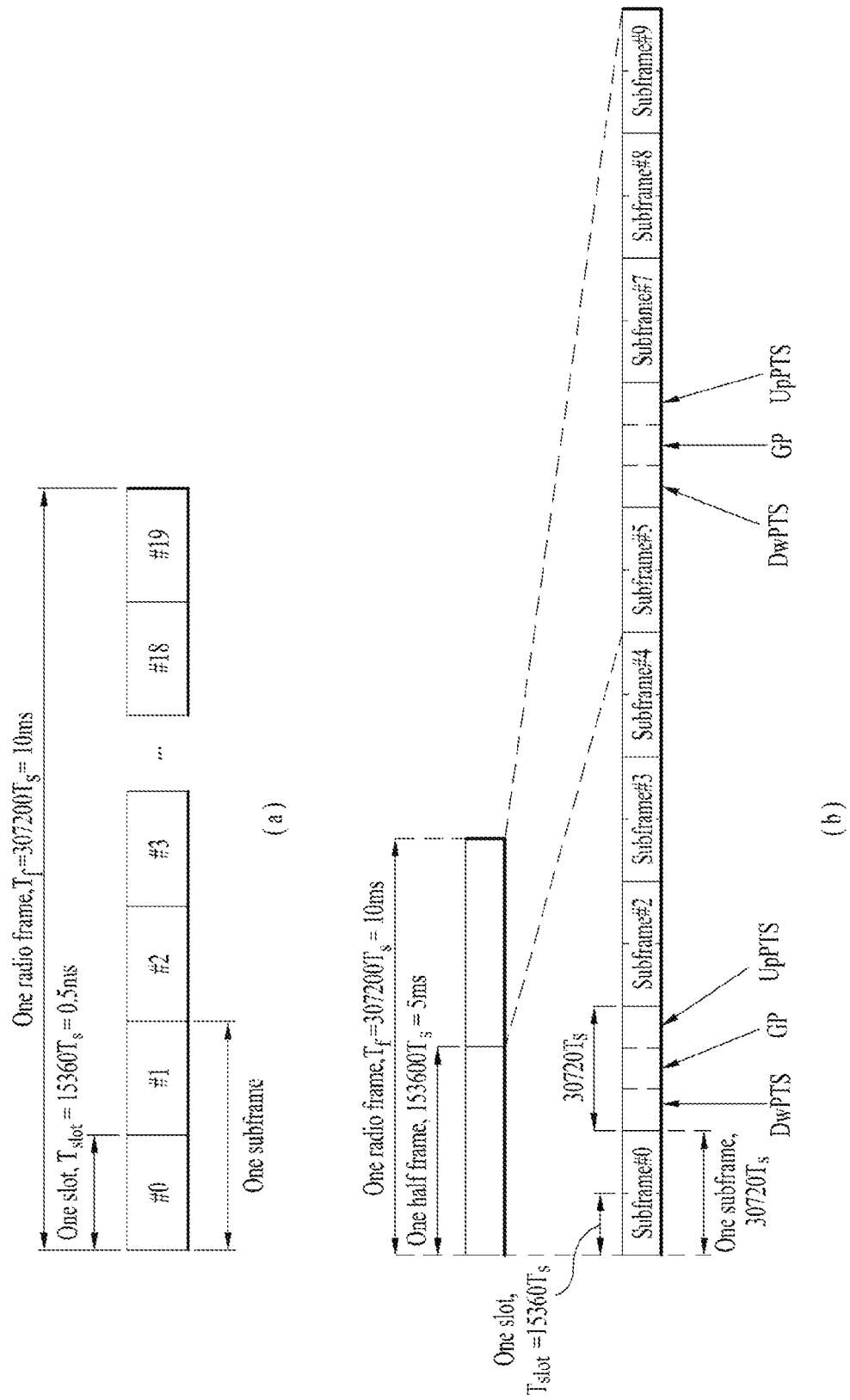
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/ received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/ PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/ PDSCH/PUCCH/PUSCH/PRACH, is referred to as a PDCCH/PCFICH/PHICH/PDSCH/PUCCH/PUSCH/ PRACH RE or PDCCH/PCFICH/PHICH/PDSCH/PUCCH/ PUSCH/PRACH resource. In the following description, transmission of PUCCH/PUSCH/PRACH by a UE is equivalent to transmission of uplink control information/ uplink data/random access signal through or on PUCCH/ PUSCH/PRACH. Furthermore, transmission of PDCCH/ PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/ LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
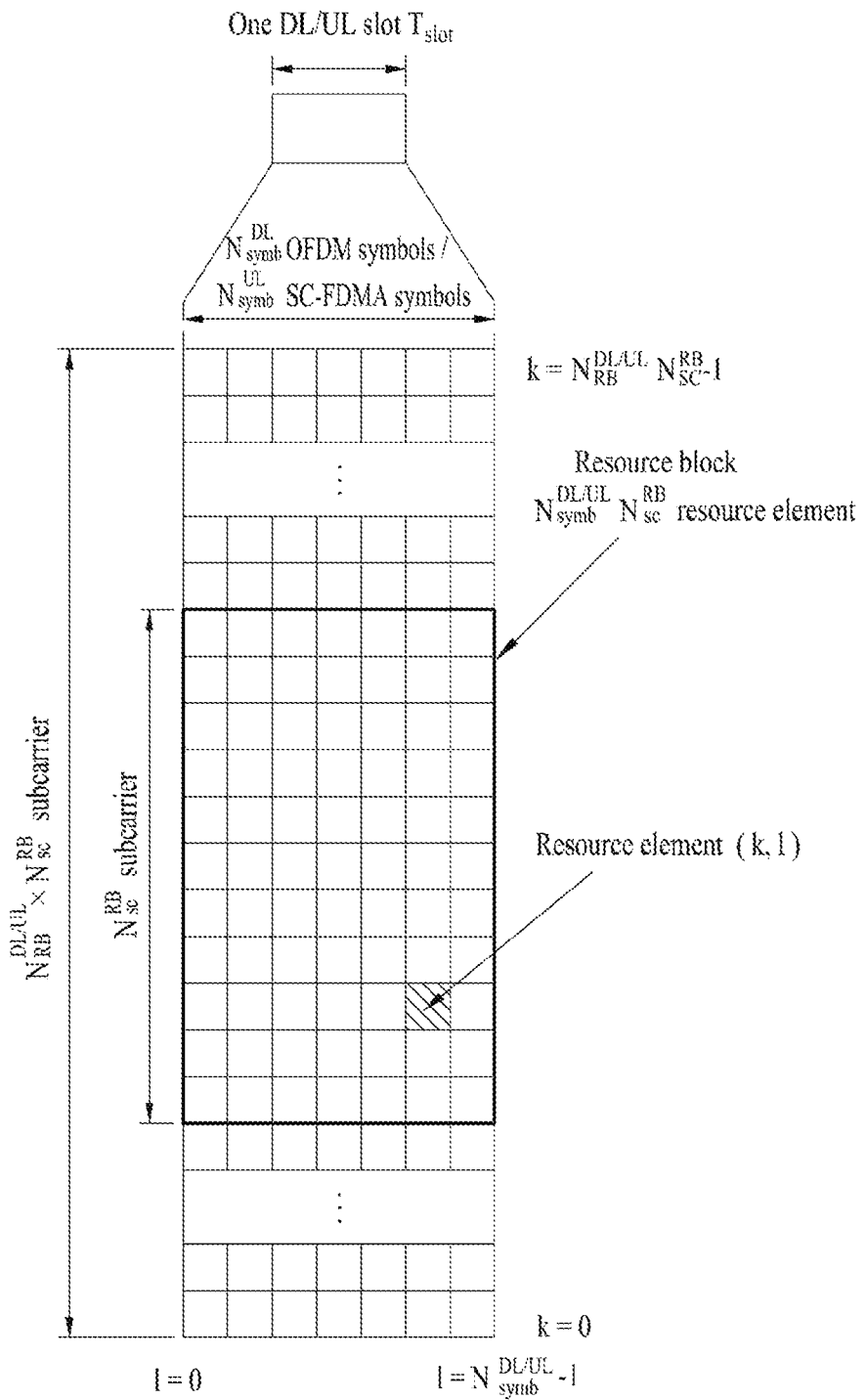
FIG. 2 illustrates an exemplary downlink/uplink (DL/UL) slot structure in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols.

Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
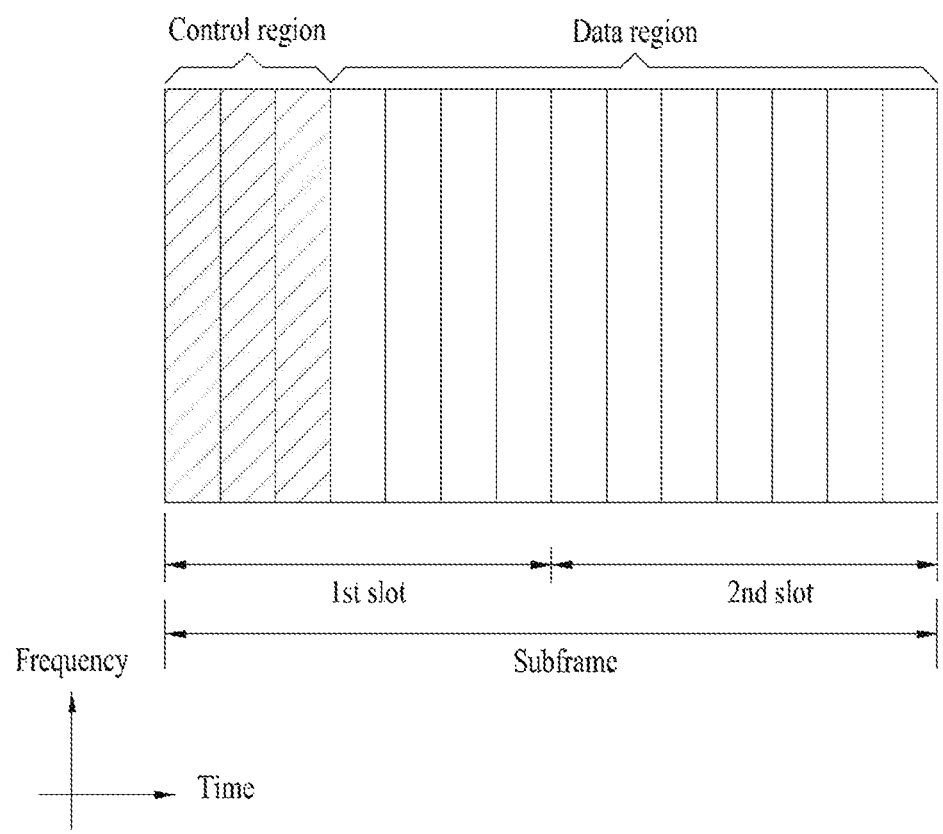
FIG. 3 illustrates an exemplary DL subframe structure in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
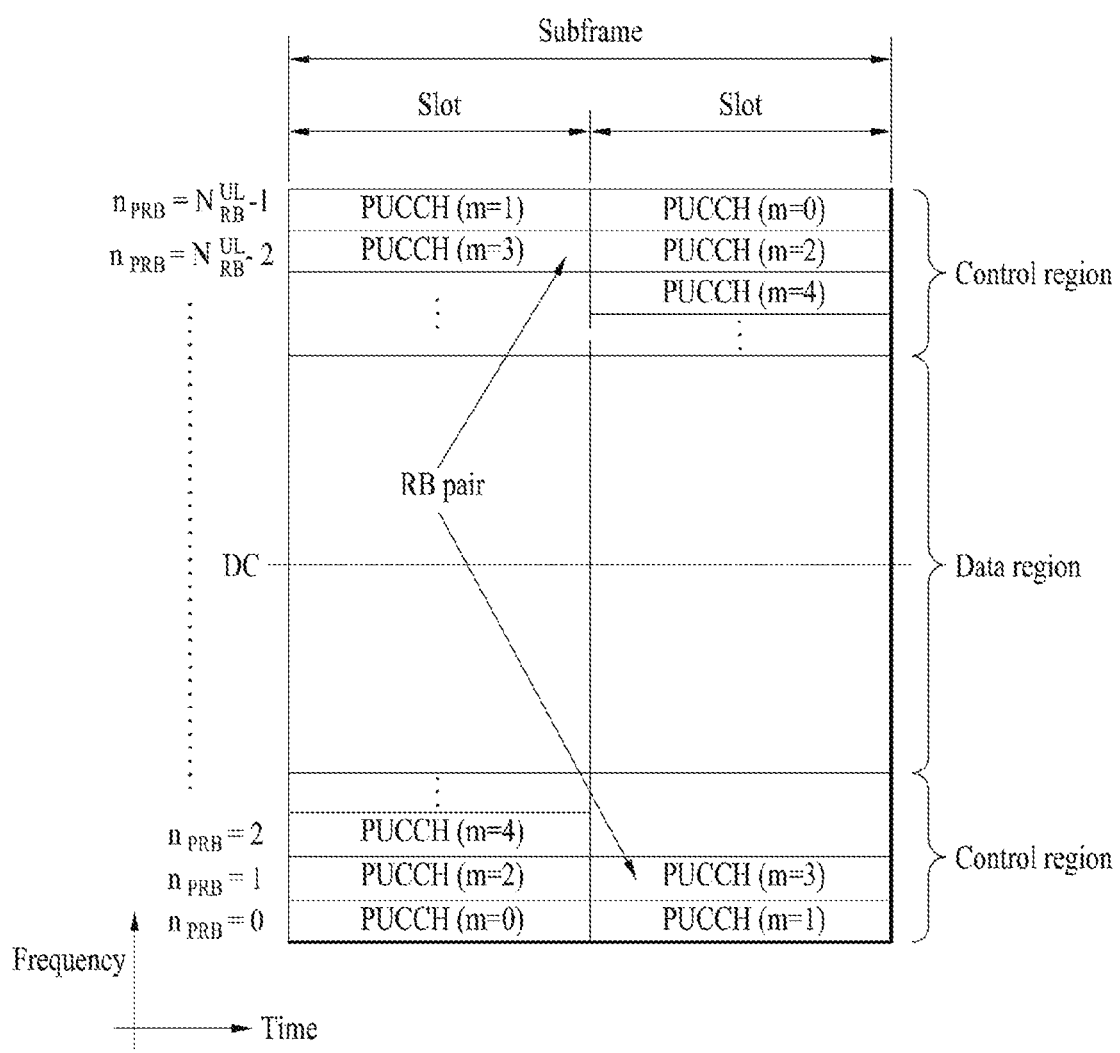
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

The present invention relates to a method of providing a plurality of different services in a system by applying a different service parameter according to a service or a UE to satisfy a requirement of each of a plurality of the services. In particular, the present invention relates to a method of reducing latency as much as possible by transmitting data as soon as possible during a short time period using a short TTI (transmission time interval) for a service/UE sensitive to latency and transmitting a response within short time in response to the data. On the contrary, it may transmit and receive data using a longer TTI for a service/UE less sensitive to the latency. For a service/UE sensitive to power efficiency rather than the latency, it may repetitively transmit data with the same lower power or transmit data using a lengthened TTI. The present invention proposes a method of transmitting control information and a data signal for enabling the abovementioned operation and a multiplexing method.

For clarity, 1 ms currently used in LTE/LTE-A system is assumed as a basic TTI. A basic system is also based on LTE/LTE-A system. When a different service/UE is provided in a base station of LTE/LTE-A system based on a TTI of 1 ms (i.e., a subframe length), a method of transmitting a data/control channel having a TTI unit shorter than 1 ms is proposed for a service/UE sensitive to latency. In the following, a TTI of 1 ms is referred to as a normal TTI, a TTI of a unit smaller than 1 ms (e.g., 0.5 ms) is referred to as a short TTI, and a TTI of a unit longer than 1 ms (e.g., 2 ms) is referred to as a long TTI.

And, a short TTI can also be represented by the number of symbols. As mentioned in the foregoing description, in LTE/LTE-A system, one slot corresponds to 0.5 ms. In case of using a normal CP, one slot includes 7 symbols. In particular, in case of using a normal CP, a short TTI can include symbols less than 7 symbols. For example, it may be able to configure a short TTI of 2 symbols, a short TTI of 4 symbols, and the like.

Figure 5:
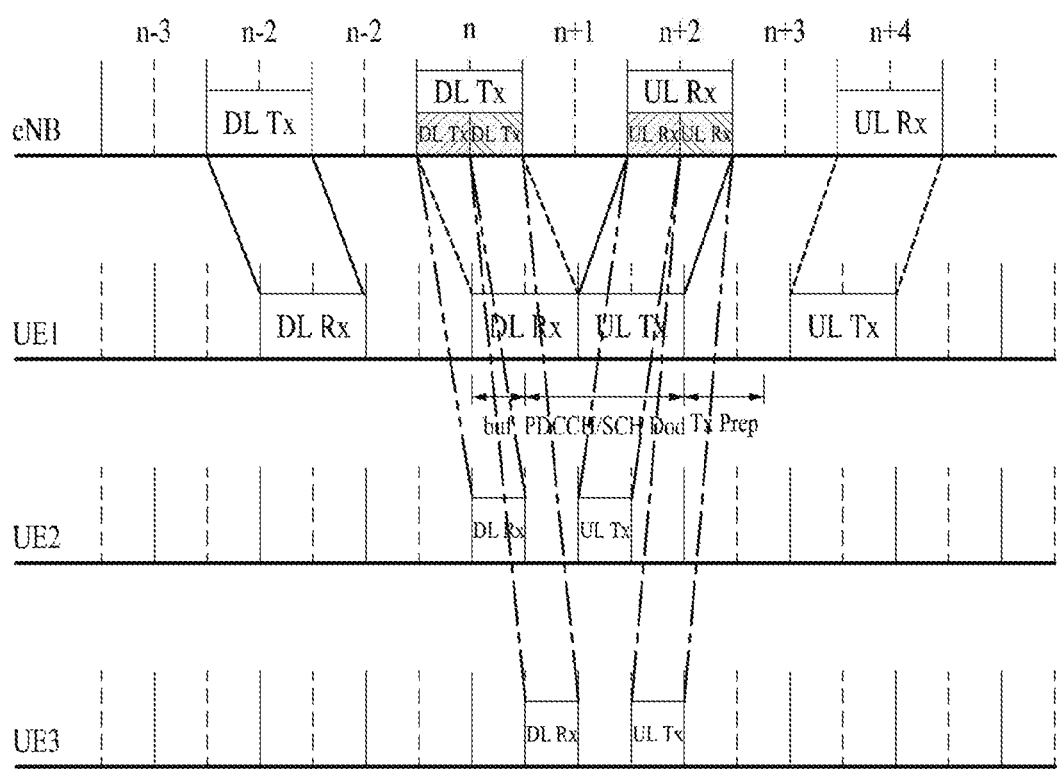
FIG. 5 is a diagram illustrating DL reception timings and UL transmission timings of user equipments (UEs) which operate in different transmission time intervals (TTIs)

First of all, a method of supporting a short TTI of a unit shorter than 1 ms in a system basically using a normal TTI of 1 ms unit used in legacy LTE/LTE-A system is described. First of all, downlink (DL) is explained. Multiplexing between channels having a different TTI size in an eNB and an example of uplink (UL) transmission for the multiplexing are shown in FIG. 5. As a TTI is getting shorter, time taken for a UE to buffer and decode a control channel and a data channel is getting shorter. Time taken for performing UL transmission in response to the control channel and the data channel is getting shorter. As shown in the example of FIG. 5, in case of transmission of 1 ms TTI, when a DL channel is transmitted in a specific $n^{th}$ subframe, an eNB can receive a response in an $(n+4)^{th}$ subframe in response to the DL channel In case of transmission of 0.5 TTI, when a DL channel is transmitted in a specific $n^{th}$ subframe, an eNB can receive a response in an $(n+2)^{th}$ subframe in response to the DL channel In particular, in order to support TTIs of a different length, it is necessary to support backward compatibility to prevent an impact on a UE operating in a legacy system only for DL and UL multiplexing of channels having a different TTI.

In a next generation system, it may consider a situation that a TTI is variously set to all physical channels or a specific physical channel to satisfy requirements in various application fields. More specifically, in case of 3GPP LTE system, it may be able to configure a TTI corresponding to a unit applied to transmission of a physical channel such as PDSCH/PUSCH/PUCCH to be shorter than 1 msec to reduce latency when communication is performed between an eNB and a UE according to a scenario. And, when a plurality of physical channels exist within a single subframe (e.g., 1 msec) for a single UE or multiple UEs, a TTI can be differently applied to each of a plurality of the physical channels. In the following description of the present invention, for clarity, LTE (LTE-A) system is explained as an example. However, it is apparent that the present invention is applied not only to the LTE (LTE-A) system but also to a communication system to be developed in the future. In this case, a TTI may correspond to 1 msec (i.e., normal TTI) as a normal subframe size in LTE system. A short TTI (i.e., sTTI) corresponds to a value smaller than 1 msec. The sTTI may correspond to a single/multiple OFDM or SC-FDMA symbol unit, by which the present invention may be non-limited. And, a UL data channel and a UL control channel transmitted within the sTTI are referred to as an sPUSCH and an sPUCCH, respectively.

The present invention proposes a UL transmission method of a UE in the case where different TTI lengths are configured for a plurality of channels (particularly, a PUCCH and a PUSCH) in a situation in which one or more TTI lengths (e.g., less than 1 ms) different from a 1-ms TTI used in the legacy LTE/LTE-A system are supported. The present invention is also applicable to a UL transmission method of a UE in the case where different TTI lengths are configured for cells. Or a similar concept may also be applied to multiplexing between TTI lengths which are different when a system supports one or more subcarrier spacings. For example, when subcarrier spacings X and 2*X are given, the present invention is applicable, similarly to a case in which one subframe is divided into two sTTIs.

Although the present invention is described in the context of LTE for the convenience, the present invention is also applicable to techniques using other waveform/frame structures, such as new radio access technology (RAT).

The present invention is applicable to, but not limited to, the following situations. The present invention is applicable to channel 1 and channel 2 in one carrier. As an example of each carrier, the present invention is applicable by mapping each carrier to one channel.

A corresponding description is applicable to virtual carrier 1 and virtual carrier 2 based on frame structures using different numerologies (e.g., TTI lengths) in one carrier. Herein, a numerology refers to definition of a TTI length, a subcarrier spacing, etc. for use in a corresponding wireless communication system.

Or, the present invention is applicable to a carrier aggregation (CA) or dual connectivity situation.

UL Power Control in Case of Overlap between Transmission Timings of Plural Channels having Different Subcarrier Spacings If the transmission timings of a plurality of channels having different subcarrier spacings overlap with each other in time, the following UL power control is proposed. For the convenience of description, the following description is given in the context of subcarrier spacings, by way of example.

Proposal 1: the power of a UL channel having a small subcarrier spacing or a specific subcarrier spacing (e.g., a subcarrier spacing pre-defined/pre-configured as a default subcarrier spacing. 15 kHz or any other value) among overlapped UL channels is maintained constant within a TTI. If zero-power transmission or puncturing occurs in one or more symbols for some reason in the middle of the constant power maintenance but the power is maintained constant before and after the zero-power transmission or puncturing, it may be assumed that the power is maintained constant. The assumption may be applied commonly to all of the following proposals in the disclosure as well as this proposal.

Proposal 2: it may be regulated that the transmission power (pre-defined/pre-agreed or pre-signaled) of a UL channel having a small subcarrier spacing or a specific subcarrier spacing among overlapped UL channels is changed in each time period unit. More specifically, the UL channel with power changing in each time period unit may be limited to a UL channel having a narrow channel spacing or a specific subcarrier spacing (e.g., a subcarrier spacing pre-defined/pre-configured as a default, 15 kHz or any other value may be used for the subcarrier spacing). A time period during which the transmission power is maintained unchanged may be configured by the network or determined according to a UE capability. The UE may report a capability related to information about the time period during which the transmission power is maintained unchanged (e.g., a minimum time period) to the network. Or a time period during which the UL channel overlaps with another channel and a time period during which the UL channel does not overlap with another channel may be distinguished from each other, and it may be regulated that the power of the UL channel is maintained constant in each of the time periods.

In determining transmission power, it may be configured that the power is increased according to (a subcarrier spacing within an allocated RB*the number of subcarriers), not according to the number of allocated RBs. For this configuration, a parameter may be configured as a transmission power per subcarrier or on the basis of a reference numerology. Herein, a numerology refers to definition of a TTI length, a subcarrier spacing, etc. for use in a corresponding wireless communication system.

If a subcarrier spacing changes, a subframe length may also change. In addition, a DL subcarrier spacing and a UL subcarrier spacing may be different from each other. Since each timing is determined on the basis of a DL/UL subcarrier spacing and a TTI, a different time may be taken to allocate transmission power for each transmission (PUCCH or PUSCH transmission), and transmission of a short-TTI channel may start during transmission of a long-TTI channel In this case, it may be difficult to consider the transmission power of the short-TTI channel in determining the transmission power of the long-TTI channel. Therefore, when the short-TTI channel should occupy transmission power, symbols of the long TTI may be punctured or decreased in transmission power. Or power guaranteed for a short TTI may be reserved and thus rendered unavailable for the symbols of the long TTI.

Further, in the case of UL transmission in a short TTI (e.g., transmission of one to two OFDM symbols), the assumption of such a power transient period as used for the current PUSCH or PUCCH results in a great impact, and thus it may be assumed that a power transient period exists outside a transmission symbol like SRS transmission. Since such a power transient period may affect legacy long TTI transmission, if at least the impact collides with a reliability-sensitive channel such as DM-RS, SRS, or the like, the UE may drop the whole transmission. Or the power transient period may be prevented by transmission with power maintained constant. This may amount to reduction of the transmission power of a channel in the middle of transmission, but it is assumed that the total power is maintained. For example, when a long-TTI PUSCH is transmitted, the network may configure large transmission power in consideration of transmission of a short-TTI PUCCH/PUSCH, and the transmission power may be maintained during a total time period in which the two channels are transmitted. If a UL transmission of a long TTI overlaps with a UL transmission of one or more short TTIs, a transmission power may be set to up to a maximum power, and the UE may maintain the transmission power irrespective of the number of transmitted channels. This operation may be for the case where the UE shares one amplifier. Otherwise, the constraint may not be imposed on the UE.

If a power transition period has relatively large overhead due to use of a large subcarrier spacing or the like, the above constraint may be more useful. If channels having different transmission power are transmitted successively, the largest of the transmission power of the transmitted channels may be maintained. That is, in order to decrease a transmission power change between successive transmission channels (which are or are not overlapped), for example, the UL power of one subframe may be maintained constant. It may be regulated that when a UE transmits successive channels, transmission power is neither increased nor decreased. Under circumstances, the transmission power of the UE may be larger or smaller than configured transmission power. This power transition period may be assumed for a guard period (GP) or a subframe boundary. Or in the case of a wide subcarrier spacing, it may be assumed that the first one or more OFDM symbols and/or at least one or a few OFDM symbols of a subframe are used as a power transient period, when needed (except for successive UL transmissions). In this case, a few symbols may be punctured. For this purpose, a GP may also be considered for DL to UL switching.

It may be regulated that a UE calculates/reports a power headroom report (PHR) per subcarrier spacing (or per numerology). Or it may be considered to configure a reference subcarrier spacing separately for PHR transmission. In this case, one PHR may be transmitted, and in the presence of a plurality of UL CCs, it may also be assumed that one reference subcarrier spacing is configured. The reference subcarrier spacing may be set or configured by higher-layer signaling or the like, or may be based on a default numerology for a PCell and/or a PSCell. Or, the reference subcarrier spacing may always be assumed to be a predetermined value, for example, 15 KHz. This configuration may be useful, particularly when numerologies with different subcarrier spacings are multiplexed in one carrier. Or the default numerology may be based on a numerology for a UL carrier in which a PHR is fed back, or a UL numerology for a PCell. Or the default numerology may be calculated on the basis of a numerology configured for each channel.

In a situation in which a part of DL symbols, a GP, and UL symbols in a predetermined time period (e.g., a 1-ms subframe) are configured differently in each cell, if a specific cell is to perform a UL transmission, it may be regulated that up to maximum transmission power P_CMAX configured for a UE is allocated as transmission power for the UL transmission in a symbol or TTI corresponding to a specific usage in another cell, irrespective of per-carrier maximum transmission power P_CMAX,c.

Or it may be regulated that transmission power preconfigured or signaled by a dynamic control signal (e.g., DCI) is allocated at a timing corresponding to a symbol or TTI corresponding to a specific usage in another cell.

Or it may be regulated that maximum available power (e.g., P_CAMX or P_CMAX-guaranteed power, c) preconfigured for each cell, characteristically guaranteed power allocated to other carrier(s) is not reserved.

The specific usage as mentioned above may be defined as non-UL, DL/GP, or a case of allocating no sidelink resources. This case may be limited to a situation in which a UE and a network have identical information (examples of this case: a case in which a UL transmission period of a specific cell overlaps with a DL subframe/burst based on a semi-static DL/UL configuration in another cell, a DTX period, a measurement gap (when configured separately), an unavailable subframe/resource, etc.), or may correspond to a case of making a determination by the UE. The UE may use the maximum power without allocating guaranteed power or the like in a situation in which there is no need for reserving power on the basis of dynamic information such as scheduling information or the like.

Figure 6:
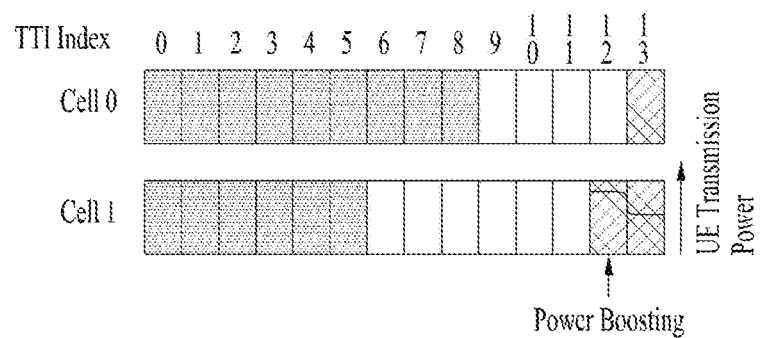
FIG. 6 illustrates power boosting of a UE according to an embodiment of the present invention.

For example, in FIG. 6, at the time of TTI #12, cell 0 is configured as a GP. Then, it may be regulated that up to P_CMAX can be used as the transmission power of a UL transmission in cell 1. If a UL transmission in cell 1 overlaps with the UL transmission power of cell 0 and the overlapped part does not exceed T (e.g., T=0 μsec or T=33 μsec), it may be assumed that total power may be used for the UL transmission of cell 1. This configuration may be implemented according to a transmission period, for example, per symbol, channel, subframe, UL burst, or mini-subframe.

More generally, in a situation in which each cell has a different numerology (e.g., TTI length or subcarrier spacing) or different numerologies exist in one cell, and a part of DL symbols, a GP, and UL symbols in a predetermined time period (e.g., a 1-ms subframe) are configured differently per cell or per numerology, if a UL transmission is to be performed in a specific cell/numerology, up to maximum transmission power P_CMAX configured for a UE may be allocated as the transmission power of the UL transmission only in a symbol or TTI that does not overlap with a symbol or TTI corresponding to UL in another cell/numerology, irrespective of per-carrier maximum transmission power P_CMAX,c. Or it may be regulated that transmission power pre-configured or signaled by a dynamic control signal (e.g., DCI) is allocated only in a symbol or TTI that does not overlap with a symbol or TTI corresponding to UL in another cell/numerology.

Or when a UL transmission is to be performed in a specific cell/numerology, it may be regulated that guaranteed power configured for another cell/numerology may not be reserved in a symbol or TTI that does not overlap with a symbol or TTI corresponding to UL in the other cell/numerology.

Figure 7:
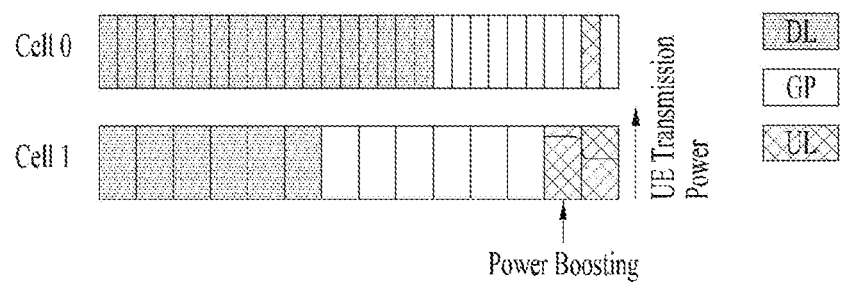
FIG. 7 illustrates power boosting of a UE according to an embodiment of the present invention.

For example, in FIG. 7, the transmission power of a UL transmission may be up to P_CMAX only in TTI #12 of cell 1 that does not overlap with UL of cell 0.

Figure 8:
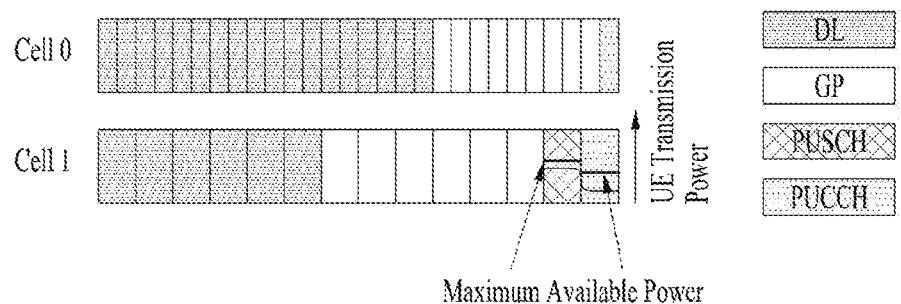
FIG. 8 illustrates the maximum transmission power of a UE according to an embodiment of the present invention.

In another example, in FIG. 8, when only a part of a plurality of UL channels in cell 1 overlap with UL of cell 0, it may be regulated that UL transmission power for a non-overlapped PUSCH transmission in cell 1 may be up to P_CMAX, or guaranteed power for cell 0 may be used for the PUSCH transmission, without being reserved. On the other hand, the guaranteed power for cell 0 may be ensured in an overlapped PUCCH transmission in cell 1, and up to {per-carrier maximum transmission power P_CMAX,c in cell 1—guaranteed power for cell 0} may be allocated as the transmission power of the PUCCH transmission.

Additionally, it may be regulated that a power transient period is delayed as much as possible so as to end in the last symbol or TTI corresponding to DL or GP (not UL) of another cell.

Resources based on a cell/numerology may be used in the case where a UE and a network have identical information (e.g., a case in which a UL transmission period of a specific cell overlaps with a DL subframe/burst based on a semi-static DL/UL configuration in another cell, a DTX period, a measurement gap (when configured separately), an unavailable subframe/resource, etc.), or in the case where the UE makes a determination. In a situation in which the UE does not need to reserve power on the basis of dynamic information such as scheduling information or the like, the UE may use maximum power without allocating guaranteed power.

On the assumption of a dual connectivity situation for a UE, each of a master cell group (MCG) and a secondary cell group (SCG) may not have knowledge of the scheduling situation of the other CG. In this case, since there is no way to detect inter-channel overlap, if the afore-described power boosting is performed in a specific CG, the specific CG may not guarantee transmission power for the other CG. Accordingly, it may be regulated that the above operations are applied only when both a UE and a network are equally aware of a scheduling situation.

Figure 9:
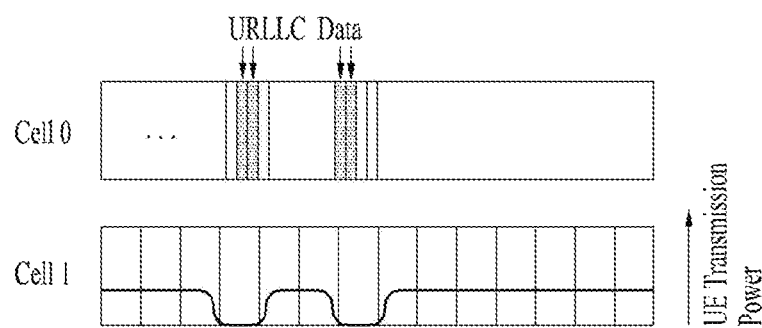
FIG. 9 illustrates power boosting and puncturing of a UE for a specific cell according to an embodiment of the present invention.

In a situation in which each cell has a different numerology (e.g., TTI length or subcarrier spacing) or different numerologies exist in one cell, it may be regulated that a puncturing operation is performed for a second transmission in a symbol or TTI in which a UL transmission (a first transmission) with a specific numerology defined to have a higher priority level overlaps with a UL transmission (the second transmission) with another numerology, and power allocated to the symbol or TTI of the second transmission is added to the transmission power of the first transmission. The first transmission may be a transmission having a relatively short TTI length and/or a relatively wide subcarrier spacing, whereas the second transmission may be a transmission having a relatively long TTI length and/or a relatively narrow subcarrier spacing. Herein, it may be regulated that up to maximum transmission power P_CMAX configured for a UE may be allocated as the transmission power of the first transmission with a higher priority level, irrespective of per-carrier maximum transmission power P_CMAX,c. In other words, power guaranteed for and power already allocated to the second transmission may all be used for the first transmission. Characteristically, the first transmission defined to have a higher priority level may be transmission of data requiring low latency, such as ultra-reliable low latency communications (URLLC) data. For example, if cell 0 has a subcarrier spacing of 60 KHz, cell 1 has a subcarrier spacing of 15 KHz, and a UL transmission of cell 0 is for URLLC data with a higher priority level in FIG. 9, cell 1 is punctured in a symbol overlapped with the UL transmission of cell 0, and power is further allocated to the UL transmission of cell 0. Or this transmission may be for more important data such as uplink control information (UCI).

Application of the second-transmission puncturing and/or first-transmission power boosting operation may be limited to a symbol or TTI which overlaps with the first transmission and does not include a specific channel/RS. Characteristically, the specific channel/RS may be a DM-RS, an SRS, or a physical random access channel (PRACH).

If the first transmission is a PRACH transmission, it may be regulated that the second transmission is punctured and/or the first transmission is power-boosted. However, if the second transmission is a PRACH transmission, this case is exceptional. Or if the second transmission is for data with a relatively high priority level (e.g., URLLC data), it may also be exceptional. Further, if the second transmission is for a PUCCH or UCI or an orthogonal cover code (OCC) is applied to the second transmission, and thus puncturing affects the whole transmission, it may be regulated that the second transmission is exceptional. In other words, this operation may be limited to a case in which the second transmission is for a data symbol in UL data (without UCI).

Application of the second-transmission puncturing and/or first-transmission power boosting operation may be limited to a case in which the second transmission fully overlaps with the first transmission in symbols or a TTI within a pre-defined/pre-agreed specific period or a specific period signaled by a higher-layer/physical-layer signal. For example, on the assumption that the specific period is defined by two symbols, if a third symbol of the second transmission overlaps with the first transmission, the second-transmission puncturing and/or first-transmission power boosting operation may not be performed. Or a certain code rate may be matched by maintaining the total number of punctured symbols (of the second transmission) to be equal to or less than a predetermined number (signaled by a higher-layer/physical-layer signal). Further, even when the sum of required power exceeds P_CMAX during a transmission, the transmission power may exceed P_CMAX unless an overlapped period exceeds a predetermined T value (e.g., T=33 μsec). Herein, T corresponds to 0.5 symbol in legacy LTE (i.e., 1 ms=1 subframe) and 1 symbol in a system with a subcarrier spacing of 30 KHz.

In the above situation, puncturing of the second transmission may be replaced with rate-matching of the second transmission. To support the rate-matching of the second transmission, at least a processing time for the rate-matching should be secured. Therefore, it may be regulated that the rate-matching of the second transmission is applied only to a case in which a dynamic control channel (e.g., DCI) for scheduling of the first transmission is received a predetermined time earlier.

Further, in the case of short-term power boosting, it may be limited to a case in which a power amplifier is separately configured for another carrier. This may be limited to inter-band CA. If a power amplifier is shared, it may be assumed that the second transmission is wholly dropped. That is, an opponent transmission may be discontinued temporarily or dropped for short-term power boosting of a data type/use scenario/channel for which application of guaranteed power is exceptional, such as URLLC.

A minimum guaranteed power value may be configured (or signaled) independently (differently) for each numerology (e.g., TTI length, subcarrier spacing, etc.) and/or service type (e.g., URLLC or eMBB). A UE may implicitly apply a different minimum guaranteed power value according to the numerology and/or service type of its transmission data, or an indicator indicating the numerology and/or service type of data that an eNB schedules may additionally be defined in a UL grant. More generally, it may be assumed that a guaranteed power configuration and a power parameter configuration are configured separately for a specific sTTI and/or numerology set. In this case, it may be configured that guaranteed power is not applied. Then, transmission power of up to P_CMAX,c or P_CMAX may be used for a corresponding transmission. If this configuration is received, or generally, a PHR may be reported separately from other cases.

It may be assumed that an sTTI/long TTI and a different numerology are not applied to intra-band contiguous CA. It is also applied to time division multiplexing (TDM) in one carrier. This may be extended to the generalization that different numerologies including an sTTI and a long TTI or different subcarrier spacings in one carrier are not assumed in the case where a power amplifier is shared. Then, it may be assumed that each case allows only TDM. In this case, if multiplexing is exceptionally allowed to process URLLC, a PRACH, or data with a very high priority level, it is assumed that a transmission with a long TTI or a transmission other than a URLLC transmission is dropped. The corresponding function may rely on the power amplifier structure of the UE, and thus the UE may report its processing capability or drop or puncture according to its capability in a corresponding situation. For a UE, to which this situation is likely to often occur, a DM-RS transmission may be performed in CDM/FDM in each data symbol, so as to allow puncturing instead of dropping. Or DM-RSs may be transmitted across as many symbols as possible in order to cope with phase-discontinuity caused by a sudden power change. In another example, a URLLC transmission or a different-numerology transmission is performed on a predetermined unit basis (e.g., on a mini-subframe basis), DM-RSs required for data demodulation may be embedded in each mini-subframe. Further, when such a short-term power change occurs, a power transient period is required. Thus, the first and last symbols of each mini-subframe, one OFDM symbol, or an sTTI, or parts of the first and last symbols may be used as power transient periods. For example, OFDM symbols with a large subcarrier spacing may be filled in a mini-subframe, an sTTI, or a symbol, and one or more of the OFDM symbols may be used. For example, 8 OFDM symbols with a subcarrier spacing of 60 KHz may be filled in an sTTI of 2 OFDM symbols with a subcarrier spacing of 15 KHz, and the first and eighth OFDM symbols are available as power transient periods.

Since examples of the foregoing proposed methods may also be included as one of implementation methods of the present invention, it is apparent that they may be considered to be a kind of proposed method. Further, while the foregoing proposed methods may be implemented independently, some proposed methods may be implemented in combination (or merged). It may be regulated that information indicating whether the proposed methods are applied (or information about the rules of the proposed methods) is indicated to a UE by a pre-defined signal (or a physical-layer or higher-layer signal) by an eNB.

Figure 10:
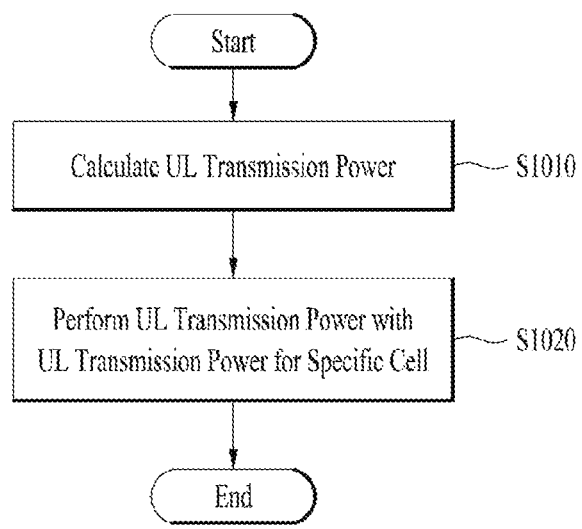
FIG. 10 is a flowchart illustrating an operation of a UE.

FIG. 10 illustrates an operation of a UE according to an embodiment of the present invention. FIG. 10 relates to a method of controlling UL transmission power for a UE configured to support a plurality of cells having one or more TTI lengths or subcarrier spacings.

The UE may calculate transmission power for a UL transmission (S1010). The UE may perform the UL transmission with the calculated transmission power in a specific cell (S1020).

Up to maximum transmission power configured for the UE may be allocated as the calculated transmission power in a symbol or TTI which does not overlap with a symbol or TTI of a UL transmission in another cell different from the specific cell, or a symbol or TTI of a UL transmission having a TTI length or subcarrier spacing different from that of the UL transmission in the specific cell. The calculated transmission power may not be limited to per-carrier maximum transmission power configured for the UE. Further, power guaranteed for the UL transmission in the cell different from the specific cell, or power guaranteed for the UL transmission having a different TTI length or subcarrier spacing from that of the UL transmission in the specific cell may not be reserved.

Further, the UE may perform puncturing for a UL transmission in a cell different from the specific cell, or a UL transmission having a different TTI length or subcarrier spacing from that of the UL transmission in the specific cell, which overlaps with the UL transmission in the specific cell, and may add power allocated to the UL transmission in the cell different from the specific cell, or power allocated to the UL transmission having a different TTI length or subcarrier spacing from that of the UL transmission in the specific cell, to the UL transmission in the specific cell.

The UL transmission in the cell different from the specific cell, or the UL transmission having a different TTI length or subcarrier spacing from that of the UL transmission in the specific cell may have a lower priority level, a longer TTI length, or a smaller subcarrier spacing than that of the UL transmission in the specific cell.

A specific channel or a specific RS may not be allocated to a symbol or TTI of the UL transmission in the cell different from the specific cell, or a symbol or TTI of the UL transmission having a different TTI length or subcarrier spacing from that of the UL transmission in the specific cell.

The UL transmission in the specific cell may fully overlap with the UL transmission in the cell different from the specific cell, or the UL transmission having a different TTI length or subcarrier spacing from that of the UL transmission in the specific cell, in a symbol or TTI within a predetermined period.

A guaranteed power value and a transmission power parameter may be configured independently for a specific TTI length or subcarrier spacing.

While the embodiments of the present invention have been described above briefly with reference to FIG. 10, the embodiment related to FIG. 10 may alternatively or additionally include at least a part of the foregoing embodiment(s).

Figure 11:
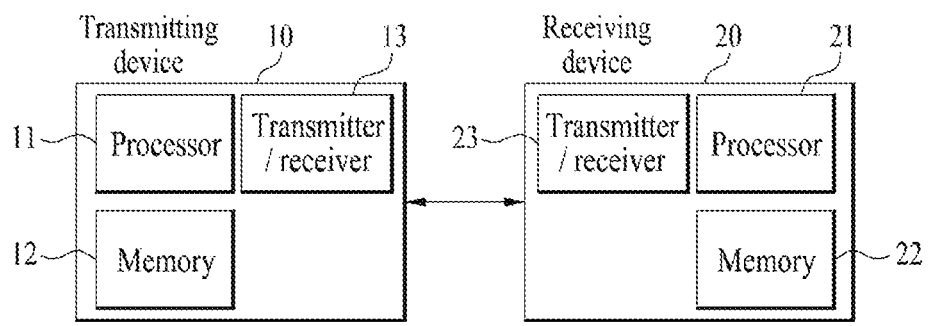
FIG. 11 is a block diagram of apparatuses for implementing an embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

What is claimed is:

1. A method of controlling uplink transmission power by a terminal supporting a plurality of cells having one or more transmission time interval (TTI) lengths or subcarrier spacings in a wireless communication system, the method comprising:
    calculating a transmission power for an uplink transmission; and
    performing the uplink transmission for a first cell with the transmission power,
    wherein a transient period for the transmission power for the uplink transmission is placed outside a starting symbol and an ending symbol of a short TTI (sTTI) for the uplink transmission, and
    wherein a number of orthogonal frequency division multiplexing (OFDM) symbols of the sTTI is less than 14-OFDM symbols.

2. The method according to claim 1, wherein the transmission power is allocated up to a maximum transmission power configured for the terminal in a symbol or a TTI which does not overlap with a symbol or a TTI of an uplink transmission for a second cell, or a symbol or a TTI of an uplink transmission having a TTI length or a subcarrier spacing different from a TTI length or a subcarrier spacing of the uplink transmission for the first cell.

3. The method according to claim 1, wherein the transmission power is not be limited to per-carrier maximum transmission power configured for the terminal.

4. The method according to claim 1, wherein power guaranteed for an uplink transmission for a second cell, or an uplink transmission having a TTI length or a subcarrier spacing different from a TTI length or a subcarrier spacing of the uplink transmission for the first cell is not reserved.

5. The method according to claim 1, further comprising:
    performing puncturing for an uplink transmission for a second cell, or an uplink transmission having a TTI length or a subcarrier spacing different from a TTI length or a subcarrier spacing of the uplink transmission for the first cell, which overlaps with the uplink transmission for the first cell; and
    adding, to the uplink transmission for the first cell, a power allocated for the uplink transmission for the second cell, or a power allocated for the uplink transmission having the TTI length or the subcarrier spacing from the TTI length or the subcarrier spacing of the uplink transmission for the first cell.

6. The method according to claim 5, wherein the uplink transmission for the second cell, or the uplink transmission having the TTI length or the subcarrier spacing different from the TTI length or the subcarrier spacing of the uplink transmission for the first cell has a lower priority level than a priority level of the uplink transmission for the first cell, a longer TTI length than a TTI length of the uplink transmission for the first cell, or a smaller subcarrier spacing than the subcarrier spacing of the uplink transmission for the first cell.

7. The method according to claim 1, wherein a specific channel or a specific reference signal is not allocated to a symbol or a TTI of the uplink transmission for a second cell, or a symbol or a TTI of the uplink transmission having a TTI length or a subcarrier spacing different from a TTI length or a subcarrier spacing of the uplink transmission for the first cell.

8. The method according to claim 5, wherein the uplink transmission for the first cell fully overlaps with the uplink transmission for the second cell, or the uplink transmission having the TTI length or the subcarrier spacing different from the TTI or the subcarrier spacing of the uplink transmission for the first cell, in a symbol or a TTI within a predetermined period.

9. The method according to claim 1, wherein a guaranteed transmission power value and a transmission power parameter are configured independently for a specific TTI length or a specific subcarrier spacing.

10. The method according to claim 1, wherein a power transient period for power control of the uplink transmission for the first cell is configured to end in a symbol or a TTI used for an usage other than an uplink usage of the cell different from the first cell.

11. A terminal configured to support a plurality of cells having one or more transmission time interval (TTI) lengths or subcarrier spacings in a wireless communication system, the terminal comprising:
    a transmitter and a receiver; and
    a processor configured to control the transmitter and the receiver,
    wherein the processor is configured to calculate a transmission power for an uplink transmission, and to perform the uplink transmission for a first cell with the transmission power,
    wherein a transient period for the transmission power for the uplink transmission is placed outside a starting symbol and an ending symbol of a short TTI (sTTI) for the uplink transmission, and
    wherein a number of orthogonal frequency division multiplexing (OFDM) symbols of the sTTI is less than 14-OFDM symbols.

* * * * *